METHOD AND APPARATUS FOR SELECTIVE ANODIZING OF METALLIZED SUBSTRATES

Filed Feb. 9, 1966 2 Sheets-Sheet 1

INVENTOR

A. R. Gerhard,

BY R. P. Miller

ATTORNEY

United States Patent Office 3,391,065

Patented July 2, 1968

3,391,065

METHOD AND APPARATUS FOR SELECTIVE ANODIZING OF METALLIZED SUBSTRATES

Allen R. Gerhard, Fullerton, Pa., assignor to Western Electric Company, Incorporated, New York, N.Y., a corporation of New York Filed Feb. 9, 1966, Ser. No. 526,139
8 Claims. (Cl. 204—15)

This invention relates to a method and apparatus for selective anodizing of metallized substrates and more particularly, to an improved method and apparatus for selectively flowing anodizing solution into contact with discrete areas of a metallic pattern deposited on an insulating substrate.

In the manufacture of thin film circuits, which may include a plurality of resistors and associated interconnecting electrical paths and contacts, a thin layer of anodizable metal, such as tantalum, is deposited on a ceramic substrate having a glazed surface. High degrees of precision and accuracy are required to achieve close tolerances required of the electrical characteristics. First, a pattern of resistors may be formed by a photoetching technique, and then the resistors are anodized to protect them. The values of the resistors are a function of the thickness and geometric configuration of the tantalum film, which are selected to have the resistor approximate, but be less than, the desired final value. Low ohmic interconnecting paths and contacts may then be deposited on the substrate.

After evaporation of the low resistance contact areas, the resistors are brought to their final value through a process of trim anodizing which is similar to protective anodizing except that it is more carefully controlled. By monitoring the resistance, the anodization can be stopped precisely when the resistors reach the required value. In the prior art, the process of trim anodizing is carried on only after the highly conductive areas have been masked off, usually in some expensive, time-consuming mechanical fashion. One solution to the problem has been to employ a capillary tube apparatus which draws anodizing solution up from a common reservoir into contact with selected, small, noncomplex areas. However, the use of a capillary tube apparatus limits the size of the pattern areas to be anodized as well as the intricacy or complexity of the pattern. There is still a need for a trim anodizing apparatus that has further ranges of versatility.

An object of this invention is to provide a new and improved method and apparatus for selective trim anodizing.

Another object of this invention is to provide a new and improved method and apparatus for flowing an anodizing solution by gravity into contact with selected electrical components of a thin film circuit to individually anodize the electrical components.

An additional object of this invention is to provide a new and improved apparatus for flowing a plurality of anodizing solutions by gravity into contact with a plurality of discrete metallic areas on a ceramic substrate, and simultaneously completing individual anodizing electrical circuits through each of said solutions and discrete areas.

A still further object of this invention is to hold a thin film circuit substrate, having a plurality of resistive areas aligned with a plurality of reservoirs containing anodizing solution, and thereafter invert the reservoirs to contact the solution with the circuit to trim anodize the resistive areas.

With these and other objects in view, the present invention contemplates a method and apparatus for trim anodizing selected areas of a thin film circuit by flowing an anodizing solution by gravity into contact with the areas and thereupon applying a current to anodize the areas. More particularly, the apparatus includes a block rotatably mounted about a horizontal axis having a plurality of reservoirs formed to extend from a normal top surface thereof and arranged in a configuration to correspond essentially to a mirror image of a resistor pattern of a thin film circuit. When the substrate is placed atop the block, each resistor is in registration with its respective reservoir. Each reservoir has a cathode electrode disposed therewithin and an anode electrode positioned to engage a contact area of the circuit.

In operation, the reservoirs are partially filled with anodizing solution and the substrate is clamped to the top surface of the block whereupon the block is rotated to an inverted position to flow the anodizing solution of each reservoir into contact with its respective area. An individual electrical circuit is thereupon energized to supply current through each of the resistor patterns to controllably anodize the resistive area to its final value.

These and other objects and advantages of the present invention will be apparent by reference to the following detailed description and the following drawings.

Figure 1:
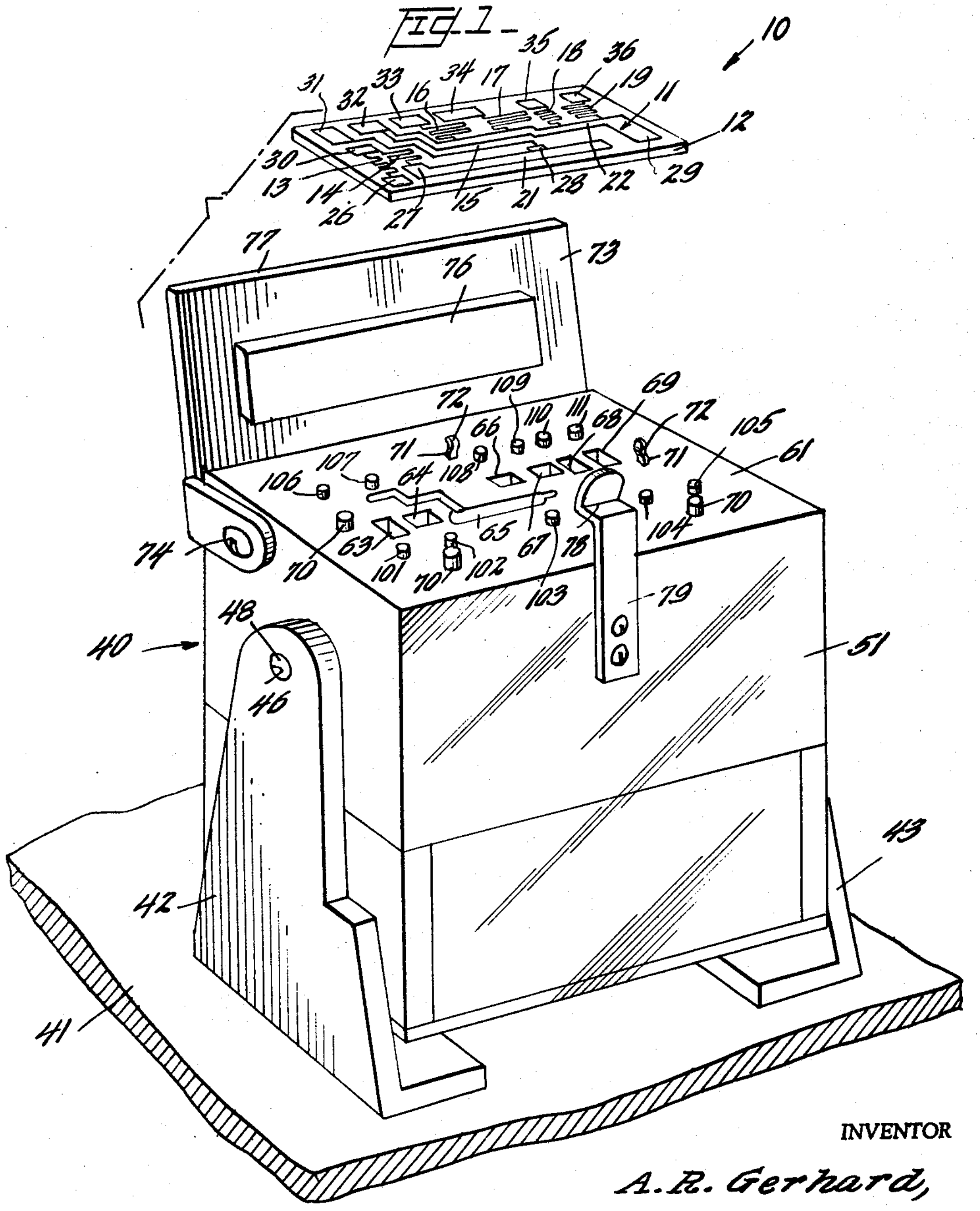
FIG. 1 is an exploded perspective view of a thin film circuit shown removed and inverted from an anodizing apparatus which embodies the principles of the present invention and includes a rotatable block with a plurality of reservoirs formed in a normal top surface thereof.

Referring to FIG. 1, there is shown a thin film device 10 comprising a thin film circuit 11 deposited on a suitable insulating substrate 12 which may be constructed of glass or ceramic. The thin film circuit 11 includes a plurality of thin film resistors 13 to 19, inclusive, of an anodizable metal such as tantalum, and a plurality of low ohmic interconnecting paths 21 and 22 typically comprised of a film of nickel-chromium alloy for adherence, a film of copper for high conductivity, and a film of gold or palladium to resist oxidation. The paths terminate in contact areas 26 to 36, inclusive, which may also comprise successive layers of a nickel-chromium alloy, copper and gold or palladium.

The thickness and geometric configurations of the resistors 13–19, after deposition and pattern generation, produce resistors of less than the final desired resistance value, but which are essentially at the same percentage of their final value. Exact values of resistance are obtained by subjecting the resistors 13 to 19, inclusive, to a process of electrochemical anodization to oxidize the tantalum film. As the oxide thickness is increased, the thickness or cross sectional area of the underlying tantalum layer is decreased, whereupon the resistance values of resistors 13 to 19, inclusive, are increased. By monitoring current flow through the resistors, the anodization can be terminated precisely when the resistors 13 to 19, inclusive, reach the desired values.

Attention is directed to FIG. 1, which shows an apparatus 40 used to carry out the anodization process. The apparatus comprises a base plate 41 on which are mounted two upright trunnions 42 and 43 having bearing bores 46 and 47 formed therein (see FIG. 3). A pair of pins 48 and 49 are journalled in the bores 46 and 47 and project therethrough into bearing bores 52 and 53 formed in a block 51 to rotatably support the block between the trunnions 42 and 43.

Figures 2, 3, 4, 5:
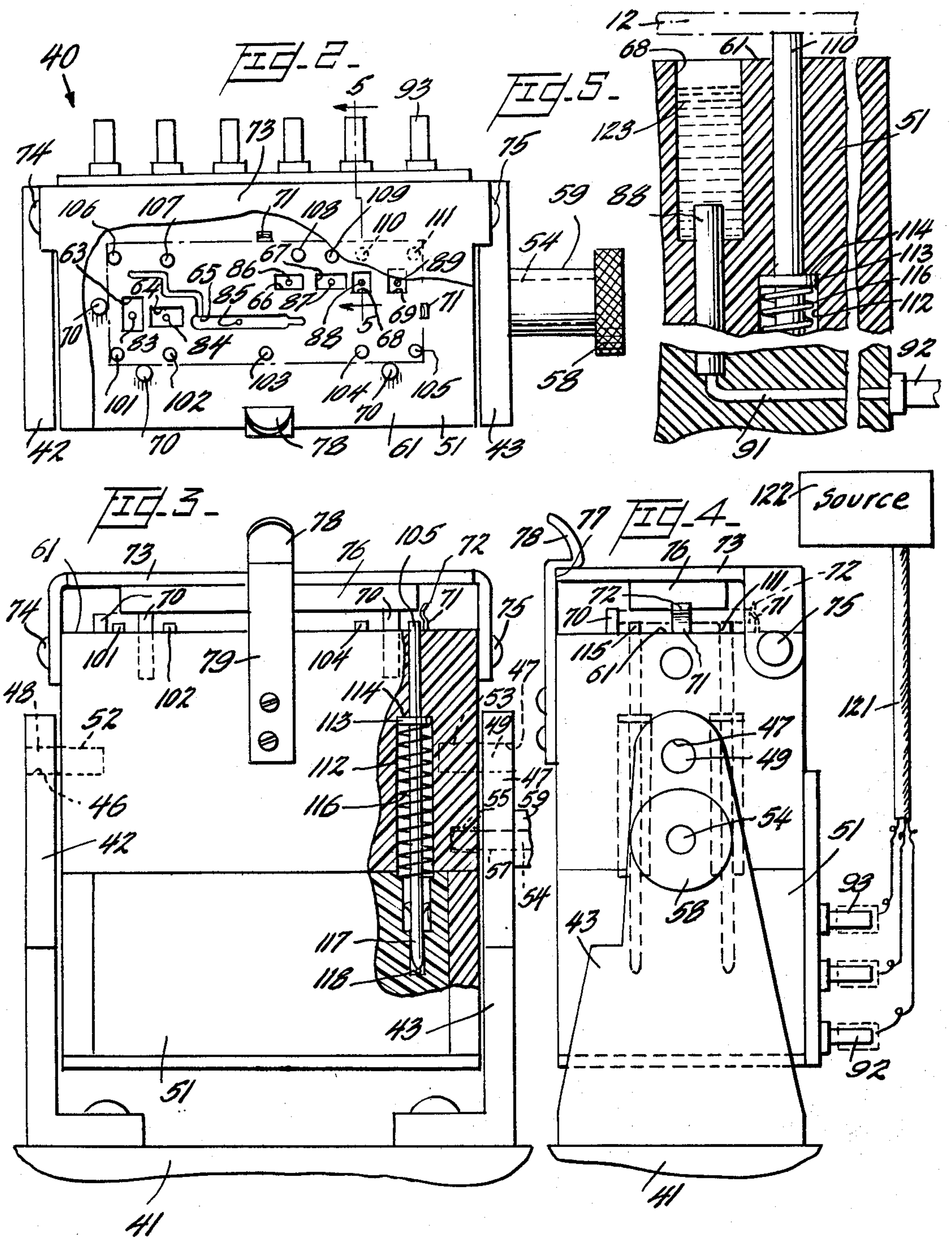
FIG. 2 is a plan view, partially cut away, and particularly illustrating the configurations of the reservoirs of the anodizing apparatus.
FIG. 3 is a front elevational view of the anodizing apparatus with a partial section taken through an anode positioned therein.
FIG. 4 is a side elevational view showing a substrate having a thin film circuit deposited thereon clamped to the block.
FIG. 5 is a detailed view of one of the reservoirs showing the relative positions of the anodizing solution, an anode, a cathode, and a thin film circuit prior to anodization.

The block 51 is rectangular and is composed of an electrical insulating material such as the acrylic resin Plexiglas. As depicted in FIGS. 2 and 3, the block 51 is prevented from being rotated by a selectively removable pin 54 which projects through a bore 57 formed in the plate 43 into a bore 55 formed in the side of the block. The pin 54 terminates, outside the block, in a knurled head 58 which is spaced from the plate 43 by a sleeve 59 concentrically disposed about the pin 54.

The block 51 has a top surface 61 into which opens a plurality of reservoirs 63 to 69, inclusive (see FIG. 1), which are arranged in an overall pattern that is essentially a mirror image of the pattern of the resistors of the thin film circuit. Locator pins 70 and resilient retainer tangs 71, having bent portions 72, extend vertically upward from the top surface of the block and are spaced to coincide with the outer periphery of a substrate. When the substrate is placed on the block 51 in contact with the pins 70, the resistors 13 to 19, inclusive, are aligned with the reservoirs 63 to 69, inclusive, and the bent portions 72 of the tangs 71 are hooked over the substrate to secure the substrate to the block.

A lid 73 is pivotally attached to the block 51 by two pivot screws 74 and 75 (see FIGS. 1 and 3). The lid 73 has a rubber pad 76 attached to its underside to contact and further hold a substrate against the top surface 61 of the block 51, without damaging the substrate. The free edge 77 of the lid 73 hooks under a spring metal keeper 78 of a plate 79 which is attached to the side of the block 51.

As shown in FIG. 2, wire-like cathodes 83 to 89, inclusive, project upward from the bottom of each of the reservoirs 63 to 69, respectively, but remain below the level of the top surface 61 of the block 51. Each of the cathodes is connected by a conductor 91 running through the block to terminate in a plug 92 that laterally extends from the lower part of a side of the block 51 (see FIG. 5).

Each of a group of anode electrodes 101 to 111, inclusive (see FIG. 2), is mounted in a stepped bore 112 (see FIG. 3) within the block 51 adjacent to each of the reservoirs 63 to 69, inclusive, and projects a slight distance vertically above the normal top surface 61 of the block 51. A collar 113 mounted on the anode normally abuts an annular area 114 of the stepped bore 112 and is held thereagainst by a compression spring 116 which is concentrically disposed about the lower end of the anode in the large diameter part of the stepped bore 112. A terminal clip 117 is attached to the lower end of each of the anodes 101 to 111, inclusive, and is connected by a conductor 118 (see FIG. 3), to one of a plurality of plugs 93 on the lower outside of the block.

The plugs 92 and 93 are connected by a slack cable 121 to any commercially available anodizing current source 122. The use of the slack cable is necessary to permit pivoting of the block 51 without disconnection of the plugs 92 and 93 from the current source.

In the usual case, where selective anodization of the resistor areas 13 to 19, inclusive, is necessary, two anode electrodes are used for each reservoir, one at each end of the resistor path. This innovation is not, of course, necessary for the anodization, but is required for continually measuring the resistance value and monitoring the anodization process. A suitable circuit for accomplishing this selective anodization may be of a type as disclosed in a copending application filed in the name of Allen R. Gerhard on Sept. 1, 1964, and assigned to the Western Electric Company, Inc., Ser. No. 394,104 and now Patent No. 3,341,445, wherein anodization takes place during one-half of the cycle and the measuring of the resistance is made during the other half cycle.

In operation of the present device with the block 51 in a normal position, each of the reservoirs is filled with an anodizing or electrolytic solution 123 which typically may comprise 0.01 percent citric acid by weight in distilled water. A substrate 12 having a thin film circuit 11 deposited thereon is placed on top of the block 51 so that the circuit is in contact with the top surface 61. The resistors 13 to 19 are aligned by the locator pins 70 with the reservoirs 63 to 69, inclusive. As the substrate is pressed against the block, the resilient tangs 71 are pushed outwardly. When the substrate is in contact with the top of the block, he tangs 71 snap back to their normal position with the bent portions 72 hooking over the substrate to lock the substrate against the block.

With the substrate in place and locked in position on the block, the anode electrodes 101 to 111 are forced downward into the block 51 against the action of the springs 116. The position of the locator pins 70 insures that the anode electrodes 101 to 111, inclusive, engage the contact areas 26 to 36, inclusive, and that the reservoirs 63 to 69 are aligned with the resistor areas 13 to 19, respectively.

The lid 73 is then swung on pivot screws 74 and 75 and over the block 51 thus moving rubber pad 76 into contact with the substrate. The lid is further depressed until the edge 77 of the lid 73 catches the keeper 78 and locks the lid against the substrate. Furthermore, the substrate is subjected to the compressive force of the lid which is sufficient to form a seal between (1) the rubber pad 76 and (2) the substrate and the top surface 61 of the block 51 to prevent the escape of the anodizing solution when the block is inverted.

The anodes and cathodes are connected from the plugs 92 and 93 to the anodizing current source 122 which functions to supply a positive potential to the anodes 101 to 111, inclusive, and hence the resistors 13 to 19, inclusive, with the resistors serving as the anodes during the actual anodization. The cathode electrodes 83 to 89, inclusive, are led to a point of negative or ground potential in the anodization control circuit. Suitable resistance monitoring means (not shown), such as a voltmeter calibrated in units of resistance, are incorporated in the anodization control circuit and connected to the anodes in order to monitor the resistance of each resistor.

In the next step of this method, the pin 54 is now withdrawn from the bore 55 in the block 51 and the block is rotatably inverted about pins 48 and 49 whereupon the anodizing solution 123 in each of the reservoirs flows downward by gravity. The solution 123 submerges the end of each of the cathodes and thereupon establishes a contact between the cathode electrode in each of the reservoirs 63 to 69, inclusive, and the resistor path 13 to 19, inclusive. This completes an individual anodization control circuit, for each of the resistors, from the current source 122 through the cable 121 and the plugs 92 through the conductor 91 to the cathodes 83 to 89, inclusive. The circuit is continued through the anodizing solution 123 to the resistors and interconnecting paths through the contact areas back down the anode electrodes and conductors 118 to plugs 93 and back through cable 121 to the current source. The anodization process is continued until the monitoring means indicates that the resistors 13 to 19, inclusive, have reached the desired values. The circuits may be individually deenergized as each of the resistors 13 to 19, inclusive, reaches the desired value. After all of the resistors are at their final values, the block is rotated to its normal position with the surface 61 facing upward, and the substrate is removed.

It is to be understood that the above-identified embodiment is simply illustrative of the principles of the invention and numerous other modifications may be devised without departing from the spirit and scope of the invention.

What is claimed is:

1. A method of selectively anodizing discrete areas of a thin film circuit deposited on a substrate comprising the steps of:
   - partially filling a plurality of open top reservoirs with an anodizing solution;
   - positioning the substrate to align the discrete areas with and against the open tops of said plurality of reservoirs;
   - inverting the reservoirs to flow the anodizing solution into contact with the discrete areas to complete an electrical circuit through the solution and the areas; and
   - energizing the electrical circuit to selectively anodize the areas.

2. A method of selectively anodizing discrete areas of a thin film circuit deposited on a substrate comprising the steps of:
   - partially filling a plurality of open top reservoirs with an anodizing solution;
   - aligning and holding the discrete areas with and against the open tops of said plurality of reservoirs;
   - pressing a resilient pad against the substrate to form a seal between the resilient pad and the substrate and the tops of the reservoirs;
   - inverting the reservoirs to flow the anodizing solution into contact with the discrete areas; and
   - selectively applying an electric current through the anodizing solution to the discrete areas to selectively anodize the areas.

3. An apparatus for anodizing selected metallic areas deposited on a substrate comprising:
   - means for holding an anodizing solution in corresponding alignment with and spaced from each of said selected metallic areas;
   - means mounting said holding means for movement to flow the solution by gravity into contact with the corresponding metallic areas; and
   - means energized upon flow of said solution into contact with the metallic area for applying a current through the solution and the corresponding metallic area to anodize the area.

4. An apparatus for anodizing selected portions of a metallic pattern on a substrate which comprises:
   - a member mounted for rotation about a horizontal axis, said member having a plurality of reservoirs formed to extend from a normal top surface thereof;
   - means for holding the substrate on said member to align said reservoirs with said selected portions of the pattern;
   - means for mouning the member for rotation to flow an anodizing fluid into contact with the selected portions of the pattern; and
   - means energized upon rotation of said member and contact of said fluid with said pattern for applying a current through said fluid to anodize said pattern.

5. In an apparatus for anodizing discrete areas of an anodizable metal film deposited on a ceramic substrate;
   - a block having a plurality of vertically extending reservoirs for receiving anodizing fluid, each of said reservoirs terminating in exit orifices having configurations corresponding to the discrete areas to be anodized;
   - means pivotally mounting said block for movement to pivot the exit orifices from an up position to a down position;
   - means for clamping a substrate on said block with the metal film overlying said exit orifices;
   - a cathode circuit connected through said block and adopted to terminate in said anodizing fluid;
   - an anode circuit connected to said metal film; and
   - means for pivoting said block from said up position to said down position to flow said anodizing fluid into contact with said discrete areas of said metal film and complete the anodizing circuits through said anodizing fluid and the contacted discrete areas of said metal film.

6. An apparatus for anodizing a selected portion of a metallic pattern on a substrate which comprises:
   - a block mounted for rotation about a horizontal axis, said block having a plurality of reservoirs extending from a top surface thereof, said reservoirs having a cross-sectional configuration which is a mirror image of the selected portion of the metallic pattern;
   - means for mounting said substrate on said block to align said reservoirs with said selected portion of the pattern;
   - mounting means for rotating the block to flow an anodizing fluid in each reservoir into contact with a corresponding area of the selected portion of the metallic pattern;
   - means for sealing the substrate against the block to prevent escape of the anodizing fluid when the block is rotated; and
   - means for applying a current through said fluid in each of said reservoirs and said metallic pattern to anodize said selected portion of the metallic pattern.

7. An apparatus for selectively anodizing a portion of a metallic pattern on a substrate as defined in claim 6, wherein said metallic pattern has a plurality of low resistance terminal areas and said means to apply a current comprises:
   - a cathode electrode disposed within each of said reservoirs, and extending to the vicinity of said top surface of said block for submersion in said anodizing fluid when said anodizing solution is flowed into contact with said metallic pattern; and
   - a plurality of anode electrodes about said reservoirs, each of said anodes extending from said top surface of said block to engage a contact area of said metallic pattern.

8. An apparatus for selectively anodizing a portion of a metallic pattern on a substrate as defined in claim 7, further comprising:
   - a compression spring concentrically disposed about each of said anode electrodes for biasing said anode electrodes in a upward direction to slightly protrude above the top surface of the block; and
   - means for clamping said substrate to the top surface of the block whereupon the contact areas of the metallic pattern engage the anode electrodes and force said biased electrodes downward against the action of said springs until the metallic pattern is in contact with the top of said block.

References Cited

UNITED STATES PATENTS

| | | | |
|---|---|---|---|
| 2,306,082 | 12/1942 | Prest | 204—18 |
| 2,540,602 | 2/1951 | Thomas et al. | 204—15 |
| 2,798,849 | 7/1957 | Lindsay | 204—224 |
| 3,240,685 | 3/1966 | Maissel | 204—15 |

JOHN H. MACK, *Primary Examiner.*

T. TUFARIELLO, *Assistant Examiner.*